(12) United States Patent
Scherer et al.

(10) Patent No.: US 9,176,324 B1
(45) Date of Patent: Nov. 3, 2015

(54) ENHANCED-IMAGE PRESENTATION SYSTEM, DEVICE, AND METHOD

(71) Applicants: Christoper A. Scherer, Cedar Rapids, IA (US); Travis S. Vanderkamp, Marion, IA (US); Victor E. Villagomez, Cedar Rapids, IA (US); Sarah Barber, Cedar Rapids, IA (US)

(72) Inventors: Christoper A. Scherer, Cedar Rapids, IA (US); Travis S. Vanderkamp, Marion, IA (US); Victor E. Villagomez, Cedar Rapids, IA (US); Sarah Barber, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 184 days.

(21) Appl. No.: 13/926,637

(22) Filed: Jun. 25, 2013

(51) Int. Cl.
*G06T 11/60* (2006.01)
*G02B 27/01* (2006.01)

(52) U.S. Cl.
CPC ............... *G02B 27/01* (2013.01); *G06T 11/60* (2013.01)

(58) Field of Classification Search
CPC .......... G06F 17/30241; G06F 17/3087; G02B 27/01; G06T 11/60
See application file for complete search history.

(56) References Cited

U.S. PATENT DOCUMENTS

| | | |
|---|---|---|
| 7,965,202 B1 | 6/2011 | Chiew et al. |
| 8,094,188 B1 | 1/2012 | Yum et al. |
| 8,099,234 B1 | 1/2012 | Frank et al. |
| 8,264,498 B1 | 9/2012 | Vanderkamp et al. |
| 8,384,730 B1 | 2/2013 | Vanderkamp et al. |
| 2005/0182559 A1* | 8/2005 | Listle et al. ................. 701/200 |
| 2010/0256900 A1* | 10/2010 | Yamaguchi et al. ......... 701/201 |

* cited by examiner

*Primary Examiner* — Xiao Wu
*Assistant Examiner* — Chong Wu
(74) *Attorney, Agent, or Firm* — Angel N. Gerdzhikov; Donna P. Suchy; Daniel M. Barbieri (57) ABSTRACT

A present novel and non-trivial system, device, and method for enhancing an image presented to the pilot on an aircraft display unit. Locations of visible and invisible objects related to aviation such as airports, navigation aids and facilities, and airspace are enhanced by providing highlighter bands with location highlighters. Navigation data representative of aircraft navigation information is received, and location data representative of the location of at least one object located outside the aircraft is retrieved based upon the navigation data. An image generating processor generates an image data set as a function of highlighter data associated with the location data, where the image data set is representative of a two-dimensional or three-dimensional image in which each object is enhanced with location highlighter and/or highlighter band of. The image data set may be provided to a tactical display unit, a strategic display unit, or both for display.

18 Claims, 11 Drawing Sheets

FIG. 8

ENHANCED-IMAGE PRESENTATION SYSTEM, DEVICE, AND METHOD

BACKGROUND OF THE INVENTION

1. Field of the Invention

This invention pertains generally to the field of cockpit indicators or display units that provide flight information to the pilot or flight crew of an aircraft, and more particularly to synthetic vision systems or enhanced vision systems.

2. Description of the Related Art

Modern avionics systems employ Head-Down Display ("HDD") and Head-Up Display ("HUD") systems for providing tactical and/or strategic flight information to the pilot. In an HDD system, tactical and/or strategic flight displays are mounted in the cockpit instrument panel directly in front of the pilot and below windshield level. To view the presentation of information on a display unit of an HDD system, a pilot must look down into the cockpit, causing him or her to take his or her eyes from the outside scene in front of the aircraft. In a HUD system, a HUD unit is mounted in front of the pilot at windshield level and is directly in the pilot's field of vision. The HUD system is advantageous because the display is transparent allowing the pilot to keep his or her eyes "outside the cockpit" while the display unit provides tactical flight information to the pilot.

Modern avionics systems may employ Synthetic Vision Systems (singularly, "SVS") and Enhanced Vision Systems (singularly, "EVS") for displaying terrain information to both HDD and HUD systems. The SVS and EVS systems are advantageous because they present terrain information and objects of a scene outside the aircraft to the pilot. For example, an airport, airport runways, navigation aids, and obstacles may be objects displayed by an SVS that can increase a pilot's Situational Awareness and potentially provide a means for navigation. While the presentation of this information is advantageous to the pilot, there are times when the depiction of object information could obstruct or obscure a pilot's view of tactical flight information or symbology simultaneously depicted. Airports can vary in size and can be, at times, difficult to locate and identify with the simultaneous display of flight symbology and a three-dimensional perspective of terrain. This difficulty of locating and identifying is especially acute when an airport or another object is relatively distant from the current position of the aircraft and appears relatively small due to the three-dimensional minification of distant objects.

Figure 1A:
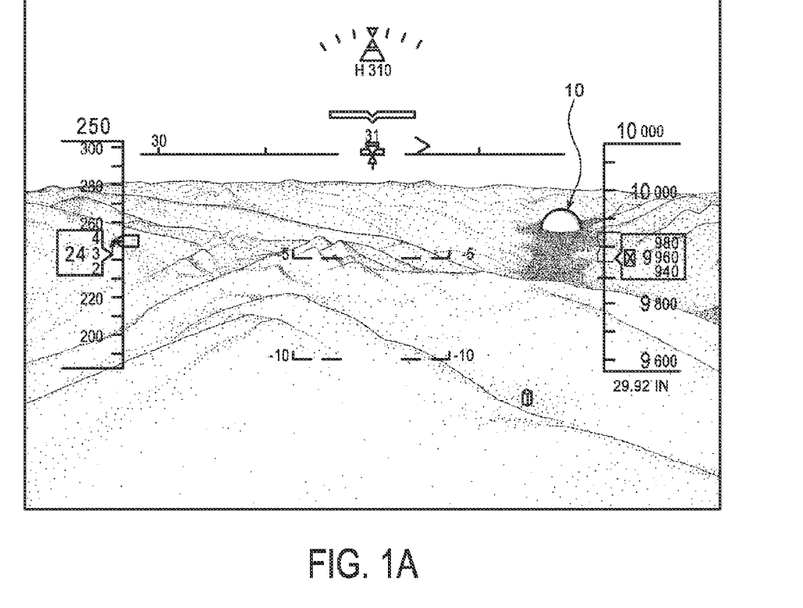
FIG. 1A depicts an image in which a use of location highlighters is illustrated.
Figure 1B:
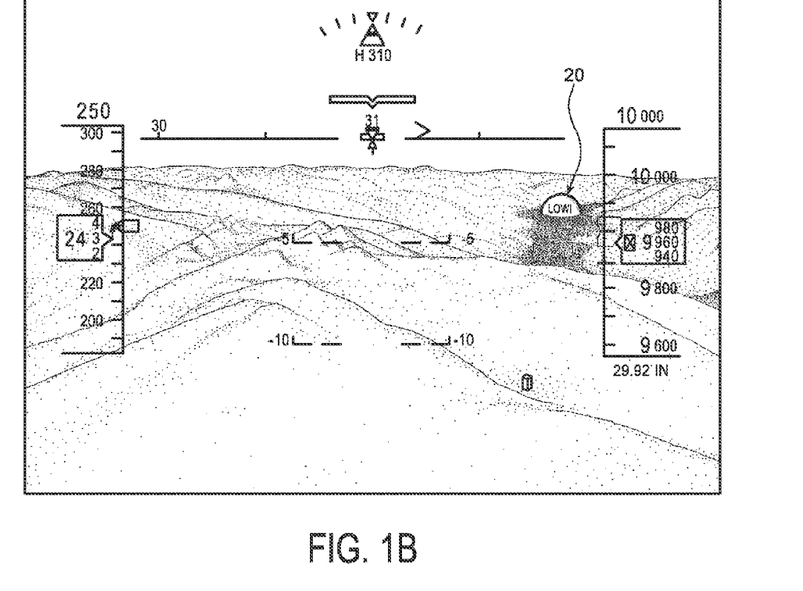
FIG. 1B depicts a second image in which a use of location highlighters is illustrated.

To aid in locating distant objects, location highlighters may be employed such as those disclosed by Yum et al in U.S. Pat. No. 8,094,188 entitled "System, Apparatus, and Method for Enhancing the Image Presented on an Aircraft Display Unit through Location Highlighters," which is incorporated by reference herein in its entirety. Examples of location highlighters are shown as items 10 and 20 in FIGS. 1A and 1B.

Figure 2A:
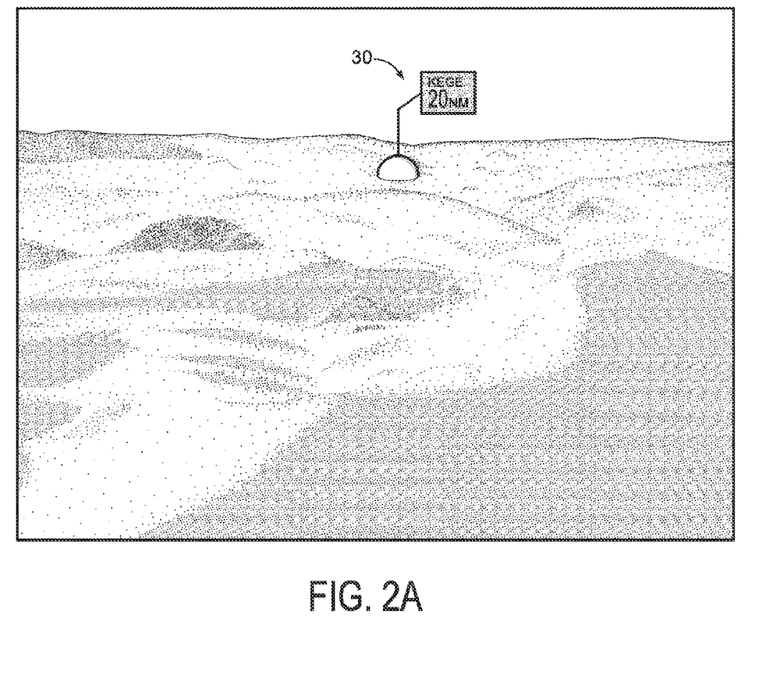
FIG. 2A depicts an image in which a use of location markers is illustrated.
Figure 2B:
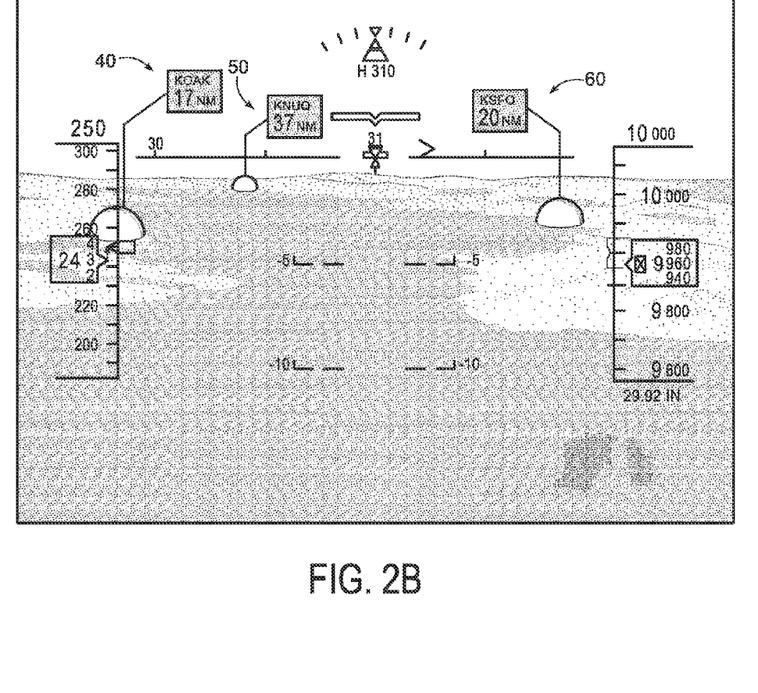
FIG. 2B depicts a second image in which a use of location markers is illustrated.

To aid in identifying distant objects, location markers may be employed such as those disclosed by Frank et al in U.S. Pat. No. 8,099,234 entitled "System, Apparatus, and Method for Generating Location Information on an Aircraft Display Unit using Location Markers," which is incorporated by reference herein in its entirety. Examples of location highlighters are shown as items 30 through 60 in FIGS. 2A and 2B.

Figure 3A:
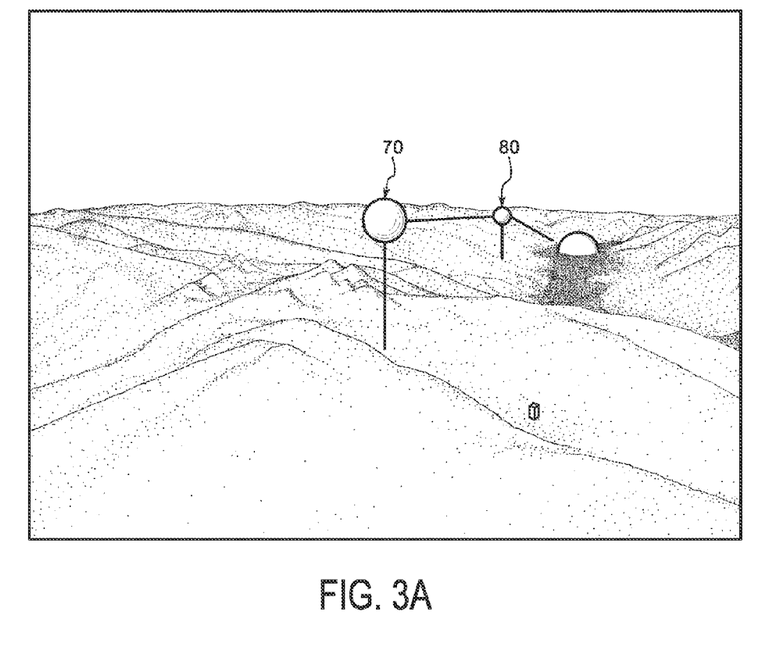
FIG. 3A depicts an image in which a second use of location highlighters is illustrated.
Figure 3B:
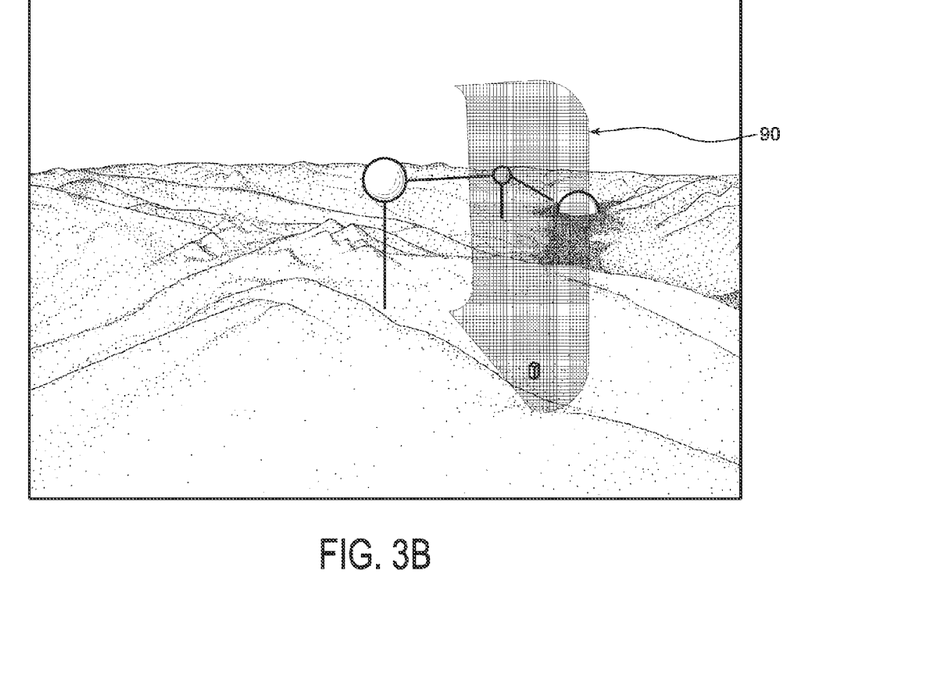
FIG. 3B depicts a second image in which a second use of location highlighters is illustrated.

Location highlighters not only aid in locating distant objects but also aid in highlighting other invisible objects such as, but not limited to, waypoints and flight path boundaries as disclosed by Chiew et al in U.S. Pat. No. 7,965,202, which is incorporated by reference herein in its entirety. Examples of location highlighters employed for invisible objects are shown as items 70 through 90 in FIGS. 3A and 3B.

Although location highlighters and location markers aid in locating and identifying distant objects, the presentation of multiple location highlighters and/or multiple location markers within the same image could present too much information and create pilot confusion which could lead to a loss of situational awareness.

BRIEF SUMMARY OF THE INVENTION

The embodiments disclosed herein present at least one novel and non-trivial system, device, and method for enhancing the image presented on an aircraft display unit with the use of highlighter bands employed with location highlighters. The use of highlighter bands can enhance a pilot's situational awareness by enhancing his or her ability to determine the location of a flight plan feature(s) such as a destination airport or alternate airport.

In one embodiment, a system is disclosed for enhancing the image presented on an aircraft display unit with the use of location bands with location highlighters. The system may be comprised of a navigation data source, location data source for one or more objects, an image generating ("IG") processor, and a display system comprised of one or more display units. Additionally, the system could include a terrain data source.

In another embodiment, a device is disclosed for enhancing the image presented on an aircraft display unit with the use of location bands with location highlighters, where such device could be the IG processor configured to generate an image data set as a function of location highlighter data associated with location data (and terrain data where a terrain data source is available and applicable). The image data set could be representative of each object enhanced with a location highlighter in a multi-dimensional image, i.e., a two-dimensional image or a three-dimensional image. Additionally, the function for generating the image data set could include highlighter band data corresponding to one or more location highlighters; if so, one or more objects represented in the image data set could be further enhanced with a highlighter band.

In another embodiment, a method is disclosed for enhancing the image presented on an aircraft display unit with the use of location bands with location highlighters, where such method could be performed by the IG processor. When properly configured, the IG processor may receive navigation data representative of aircraft position, aircraft orientation, and/or flight plan information; receive location data (and terrain data if available and applicable) corresponding to the navigation data; generate the image data set; and provide the image data set to the display system.

DETAILED DESCRIPTION OF THE INVENTION

In the following description, several specific details are presented to provide a complete understanding of embodiments of the invention. One skilled in the relevant art will recognize, however, that the invention can be practiced without one or more of the specific details or in combination with other components. In other instances, well-known implementations or operations are not shown or described in detail to avoid obscuring aspects of various embodiments of the invention.

Figure 4:
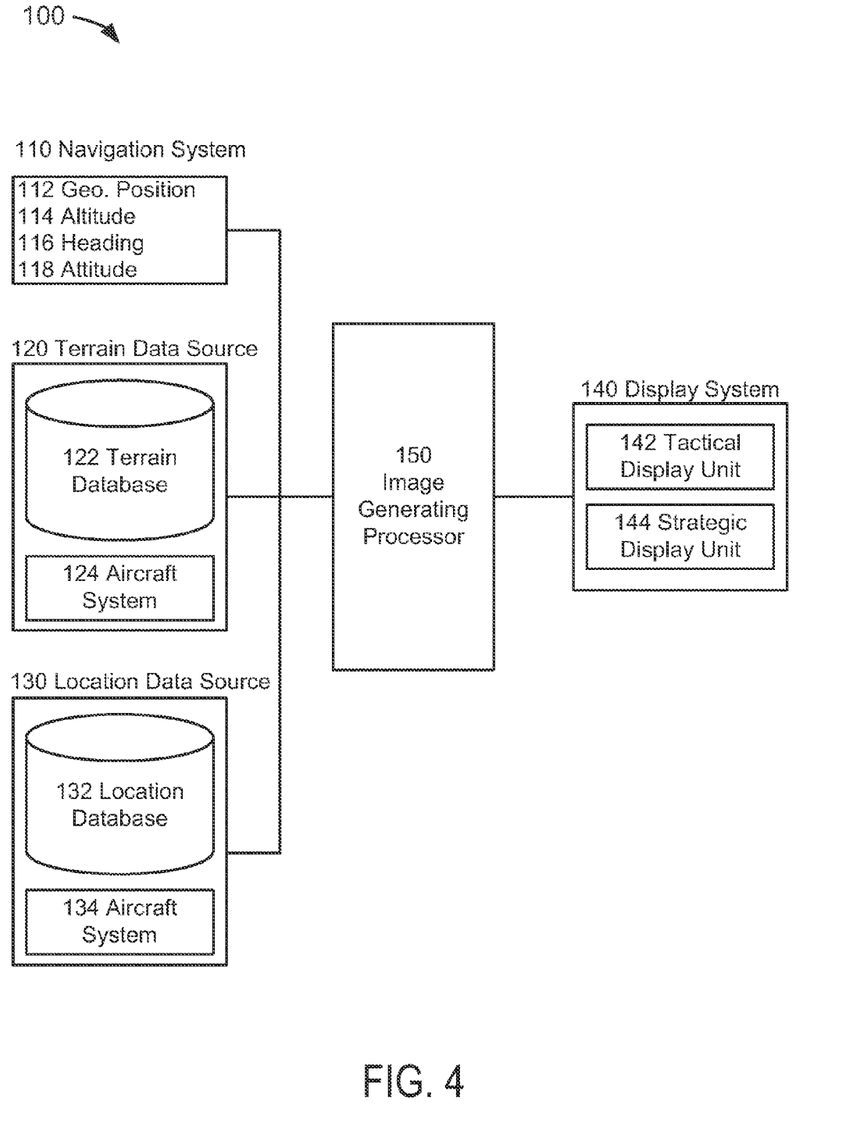
FIG. 4 depicts a block diagram of a system for enhancing the image presented to the pilot on a display unit with the use of location highlighters and/or highlighter bands.

FIG. 4 depicts a location enhancement system 100 suitable for implementation of the techniques described herein. The location enhancement system may be comprised of a navigation system 110, a terrain data source 120, a location data source 130, a display system 140, and an image generating ("IG") processor 150.

In the embodiment of FIG. 4, the navigation system 110 could be comprised of the system or systems that could provide navigation data information in an aircraft. As embodied herein, aircraft could mean any vehicle which is able to fly through the air or atmosphere including, but not limited to, lighter than air vehicles and heavier than air vehicles, wherein the latter may include fixed-wing and rotary-wing vehicles. The navigation system 110 may include, but is not limited to, an air/data system, an attitude heading reference system, an inertial guidance system (or inertial reference system), a global navigation satellite system (or satellite navigation system), and a flight management computing system ("FMCS"), all of which are known to those skilled in the art. The navigation system 110 could provide navigation data including, but not limited to, geographic position 112, altitude 114, heading 116, and attitude 118; the navigation data could also include flight plan information which identifies or states invisible objects such as waypoints and visible objects such as airports as discussed below. As embodied herein, aircraft position comprises geographic position (e.g., latitude and longitude coordinates), and heading may be derived from either geographic position, aircraft position, or both. As embodied herein, aircraft orientation may include pitch, roll, and/or yaw information related to the attitude of the aircraft. As embodied herein, a navigation system 110 could provide navigation data including, but not limited to, geographic position 112, altitude 114, heading 116, attitude 118 as well as flight plan information to the IG processor 150 for subsequent processing as discussed herein.

In the embodiment of FIG. 4, the terrain data source 120 could be comprised of any source of terrain data, obstacle data, other manmade or natural features, geopolitical boundaries, or any combination thereof. As embodied herein, the terrain data source 120 may include, but is not limited to, a terrain database 122 and other aircraft systems 124 which could employ terrain data. The terrain database 122 may be any database used to store terrain data contained in digital elevation models ("DEM"). Generally, the terrain data of a DEM is stored as grids, and each grid represents an area of terrain. A grid is commonly referred to as a terrain cell. A grid may be of various shapes. For example, a grid may be a cell defined in arc-seconds of latitude and longitude, or a grid may be rectangular, square, hexagonal, or circular. A grid may also be of differing resolutions. For instance, the U.S. Geological Society developed GTOPO30, a global DEM which may provide 30 arc-seconds (approximately 900 meters) resolution. On the other hand, the Space Shuttle Endeavour in February 2000 acquired elevation data known as Shuttle Radar Topography Mission ("SRTM") terrain elevation data which may provide generally one arc-second (or approximately 30 meters) resolution, providing much greater detail than that provided with GTOPO30 data set. At the present time, resolutions of one-arc second for SRTM terrain data are available for areas over the United States; for all other locations, resolutions of three arc-seconds (approx. 90 meters) are available. In addition to these public sources of terrain data, there are military and private sources of terrain data. Various vendors and designers of avionics equipment have developed databases that have been, for all intents and purposes, proprietary in nature.

It should be noted that data contained in any database discussed herein including the terrain database 122 and location database 132 may be stored in a digital memory storage device or computer-readable media including, but not limited to, RAM, ROM, CD, DVD, hard disk drive, diskette, solid-state memory, PCMCIA or PC Card, secure digital cards, and compact flash cards. Data contained in such databases could be loaded while an aircraft is on the ground or in flight. Data contained in such databases could be provided manually or automatically through an aircraft system capable of receiving and/or providing such manual or automated data. Data contained in such databases could be temporary in nature; for example, data representative of a temporary obstacle in the terrain database 122 could be stored, a temporary runway closure in an airport database, and a temporary flight restriction in an airspace database. Any database disclosed herein may be a stand-alone database or a combination of databases. For example, a terrain database 122 may be associated with a terrain awareness and warning system ("TAWS") only. In an alternative embodiment, the terrain data could be stored in or combined with an airport database, airspace database, or with a database used by any other aircraft system 124 and 134 including, but not limited to, a database associated with a flight management computing system and an airspace awareness and warning system ("AAWS"). An example of a TAWS was disclosed by Wichgers et al in U.S. Pat. No. 8,234,020 entitled "System and Methods for Generating Alert Signals in a Terrain Awareness and Warning System," which is incorporated by reference herein in its entirety. An example of an AAWS which utilizes airport and airspace databases was disclosed by Wichgers in U.S. Pat. No. 7,714,744 entitled "System and Methods for Generating Alert Signals in an Airspace Awareness and Warning System," which is incorporated by reference herein in its entirety.

Although other aircraft systems 124 could employ terrain databases 122, such systems could also be a source of terrain data provided to the IG processor 150. For example, a synthetic vision system ("SVS") may employ a terrain database to generate terrain image data. Here, the terrain database that is part of an SVS could be the source of terrain data in the location enhancement system 100. Alternatively, the SVS could provide the IG processor 150 with terrain data in the form of terrain image data. In another alternative, an Enhanced Vision System ("EVS") could provide terrain data in the form of terrain image data. In another alternative, a combined SVS and EVS could provide terrain data in the form of terrain image data. Other examples of other aircraft systems 124 which could comprise sources of terrain data include, but are not limited to, a TAWS and an AAWS. As embodied herein, the terrain database 122 and other aircraft systems 124 could provide terrain data to the IG processor 150 for subsequent processing as discussed herein.

In the embodiment of FIG. 4, the location data source 130 could comprise any source of location data for one or more visible and invisible objects such as but not limited to, obstacles, airports, navigation aids, and airspaces. The location data source 130 may include, but is not limited to, a location database 132 and other aircraft systems 134. Although not depicted in FIG. 4, the location data source 130 could include the terrain data source 120. The location database 132 could include, but is not limited to, an airport database and airspace database that are part of the previously-mentioned TAWS and AAWS. An airport database may be used to store airport-related data including, but not limited to, airport and runway information. Airport information could include surveyed location and elevation data, and runway information could include surveyed location and elevation data of the runway and runway threshold.

An airspace database may be used to store airspace-related data including, but not limited to, information related to regulatory special use airspace area and non-regulatory special use airspace area data. Regulatory special use airspace data may be comprised of, in part, prohibited areas and restricted areas. Non-regulatory special use airspace data may be comprised of, in part, military operations areas, alert areas, warning areas, and national security areas. Prohibited areas contain airspace of defined dimensions identified by an area within which the flight of aircraft is prohibited. Such areas may be established for safety, security, national defense, national welfare, or other reasons. Restricted areas contain airspace within which the flight of aircraft, while not wholly prohibited, is subject to restrictions. Restricted areas may denote the existence of unusual, often invisible, hazards to aircraft such as artillery firing, aerial gunnery, or guided missiles. Penetration of restricted areas without authorization from a using or controlling agency may be extremely hazardous to the aircraft and its occupants.

Airspaces may be designated as terminal or enroute airspace. As embodied herein, airspaces may include designated reporting points. Generally, an aviation regulatory authority or organization possesses the authority of designating and defining airspace. In the United States, the Federal Aviation Administration ("FAA") establishes and provides the defined dimensions of airspace. For example, the FAA has categorized airspace into five classes, i.e., Class A, Class B, Class C, Class D, and Class E, and reporting points.

Generally, airspaces are depicted on aeronautical charts or discussed in other operational publications which provide aeronautical information. An airspace may be delineated by vertical and/or horizontal dimensions. The vertical dimensions of airspace may be designated by altitude floors and ceilings expressed as flight levels or other appropriate measures such as feet or meters above mean sea level ("MSL") or other reference including the surface of the earth. The horizontal dimensions of an airspace may be defined by geographic coordinates (e.g., latitude ("lat.") and longitude ("long.")) or other appropriate references that clearly define their perimeter. An airspace may be in effect for one or more designated time periods or run continuously. Additional information regarding airspaces is disclosed in U.S. Pat. No. 7,714,744.

Although other aircraft systems 134 could employ location databases 132, such systems could also serve as a source of location data provided to the IG processor 150. For example, other aircraft systems 134 which could be comprised of sources of location data include, but are not limited to, a flight management system, a TAWS, and an AAWS. As embodied herein, the location database 132 and other aircraft systems 134 could provide location data to the IG processor 150 for subsequent processing as discussed herein.

In the embodiment of FIG. 4, the display system 140 could be comprised of any display unit or units that provide symbology of tactical flight information and/or strategic flight information such as a tactical display unit 142 and/or a strategic display unit 144, respectively. As embodied herein, the display system 140 could include a vision system (not shown in FIG. 4) which generates an image data set which represents the image displayed on a display unit(s). Vision systems include, but are not limited to, an SVS, an EVS, and/or combined SVS and EVS.

The tactical display unit 142 could be comprised of any unit that presents tactical information relative to the instantaneous or immediate control of the aircraft, whether the aircraft is in flight or on the ground. A tactical display unit 142 could be comprised of a Head-Down Display ("HDD") unit and/or a Head-Up Display ("HUD") unit. The HDD unit is typically a unit mounted to an aircraft's flight instrument panel located in front of a pilot and below the windshield and the pilot's field of vision, and the HUD unit is mounted in front of the pilot at windshield level and is directly in the pilot's field of vision. The HUD system is advantageous because the display is transparent allowing the pilot to keep his or her eyes "outside the cockpit" while the display unit provides tactical flight information to the pilot.

The tactical display unit 142 could display the same information found on a primary flight display ("PFD"), such as "basic T" information (i.e., airspeed, attitude, altitude, and heading). Although it may provide the same information as that of a PFD, the tactical display unit 142 may also display a plurality of indications or information including, but not limited to, selected magnetic heading, actual magnetic track, selected airspeeds, selected altitudes, altitude barometric correction setting, vertical speed displays, flight path angle and drift angles, flight director commands, limiting and operational speeds, mach number, radio altitude and decision height, final approach trajectory deviations, and marker indications. A tactical display unit 142 is designed to provide flexible configurations which may be tailored to the desired configuration specified by a buyer or user of the aircraft.

Figure 5A:
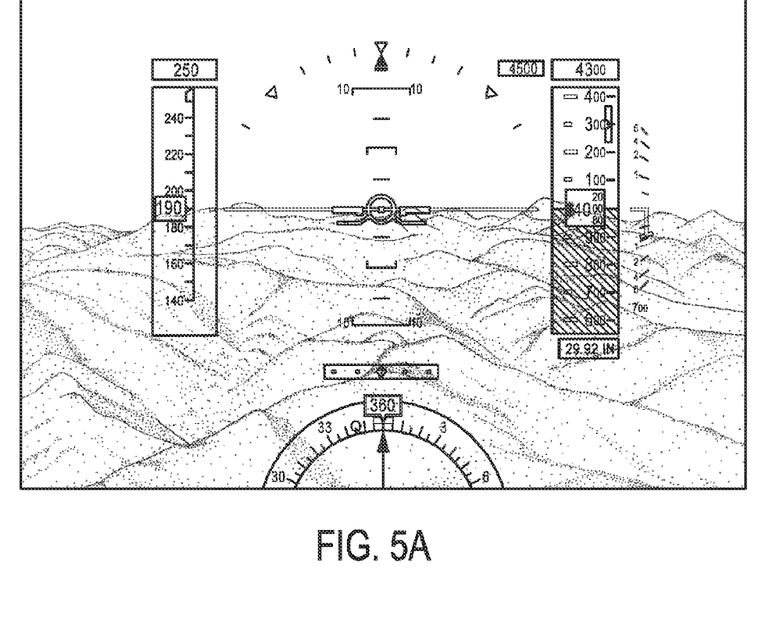
FIG. 5A provides an exemplary depiction of a tactical display unit comprised of a Head-Down Display ("HDD") unit.
Figure 5B:
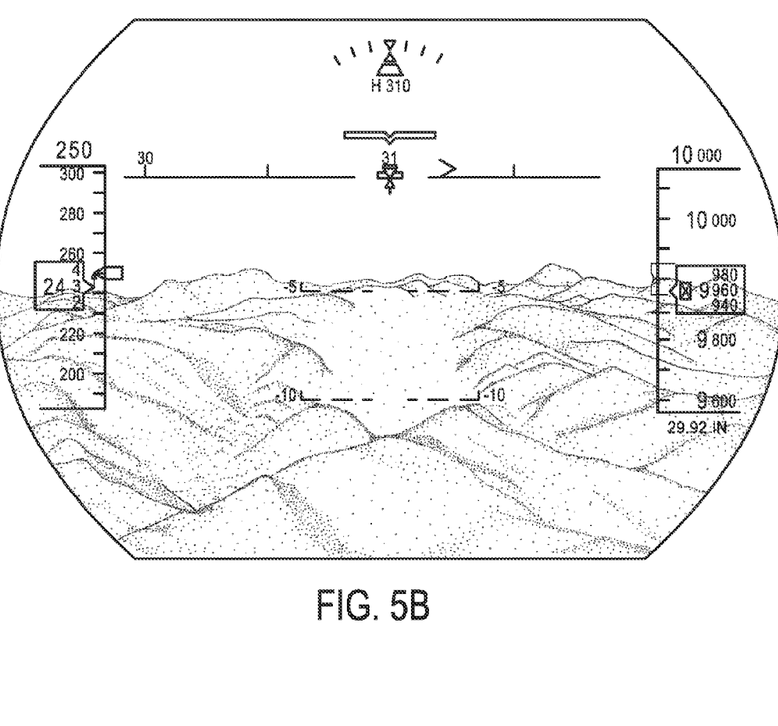
FIG. 5B provides an exemplary depiction of a tactical display unit comprised of a Head-Up Display ("HUD") unit.

FIG. 5A provides an exemplary depiction of an HDD unit for presenting tactical information to the pilot or flight crew against the background of a three-dimensional image of terrain and sky. FIG. 5B provides an exemplary depiction of a HUD unit for presenting tactical information to the pilot or flight crew against the background of a three-dimensional image of terrain and sky. Both the HDD unit and HUD unit could be employed as display units configured to present SVS image(s), EVS image(s), or combined SVS and EVS image(s). It should be noted that the tactical information depicted on the HDD unit and/or HUD unit has been made minimal for the sake of presentation and is not indicative of the plurality of indications or information with which it may be configured. Because the indications or information shown in FIGS. 5A and 5B are well-known to those skilled in the art, a discussion of the specific tactical information shown on them is not provided herein.

Both the HDD unit and/or the HUD unit may be designed to provide flexible configurations which may be tailored to the desired configuration specified by a buyer or user of the aircraft. As disclosed below, one or more locations depicted in a three-dimensional image of terrain may be enhanced using highlighter bands with location highlighters.

Returning to FIG. 4, the strategic display unit 144 could be any unit which presents strategic information to the crew relative to the intended future state(s) of the aircraft (e.g. intended location in space at specified times) along with information providing contextual information to the crew (e.g. terrain, navigation aids, geopolitical boundaries, airspace boundaries, runway traffic and/or incursion information, etc.) about such state(s). One example of such display unit is commonly referred to as a Navigation Display. In some configurations, the strategic display unit could be part of an Electronic Flight Information System ("EFIS").

Figure 5C:
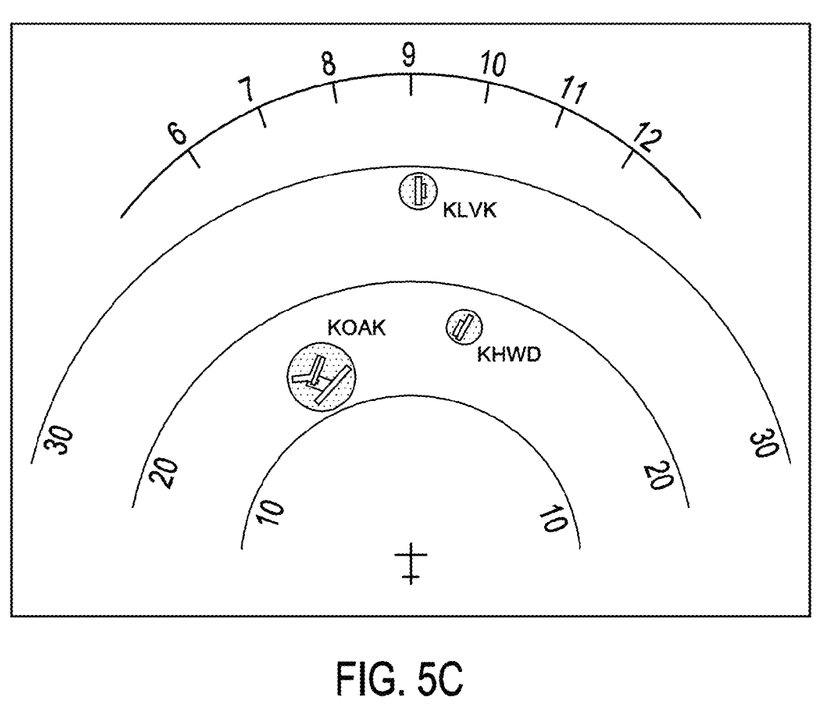
FIG. 5C provides an exemplary depiction of a strategic display unit.

FIG. 5C provides an exemplary depiction of the strategic display unit 144 for presenting strategic information to the pilot or flight crew. FIG. 5C provides an exemplary depiction of how airport information may be presented on the strategic display unit 144. It should be noted that the strategic information depicted has been made minimal for the sake of presentation and is not indicative of the plurality of indications or information with which it may be configured. Because the indications or information shown in FIG. 5C are well-known to those skilled in the art, a discussion of the specific strategic information shown in FIG. 5C is not provided herein.

The strategic display unit 144 may be designed to provide flexible configurations which may be tailored to the desired configuration specified by a buyer or user of the aircraft. As disclosed below, one or more locations depicted in a two-dimensional image may be enhanced using location highlighters with or without highlighter bands as disclosed herein.

Returning to FIG. 4, the IG processor 150 may receive input data from various systems including, but not limited to, navigation system 110, a terrain data source 120, and a location data source 130. The IG processor 150 may be operatively coupled to these to facilitate the receiving of input data; as embodied herein, operatively coupled may be considered as interchangeable with electronically coupled. The IG processor 150 may also be operatively coupled to the tactical display unit 142 and/or the strategic display unit 144 to facilitate the providing of output data to either or both units. It is not necessary that a direct connection be made; instead, such receiving of input data and providing of output data could be provided through a data bus or through a wireless network.

The IG processor 150 may be any electronic data processing unit which executes software or source code stored, permanently or temporarily, in a digital memory storage device or computer-readable media (not depicted herein) including, but not limited to, RAM, ROM, CD, DVD, hard disk drive, diskette, solid-state memory, PCMCIA or PC Card, secure digital cards, and compact flash cards. The IG processor 150 may be driven by the execution of software or source code containing algorithms developed for the specific functions embodied herein. Common examples of electronic data processing units are microprocessors, Digital Signal Processors (DSPs), Programmable Logic Devices (PLDs), Programmable Gate Arrays (PGAs), and signal generators; however, for the embodiments herein, the term "processor" is not limited to such processing units and its meaning is not intended to be construed narrowly. For instance, a processor could also consist of more than one electronic data processing unit. As embodied herein, the IG processor 150 could be a processor(s) used by or in conjunction with any other system of the aircraft including, but not limited to, a processor(s) associated with a vision system such as an SVS, an EVS, an FMCS, a TAWS, an AAWS, one or more display units, or any combination thereof.

The IG processor 150 may generate an image data set comprising terrain image data representative of terrain based upon the terrain data and highlighter data which could be associated with location data. The IG processor 150 could receive terrain data received from the terrain data source 120. If the terrain data is not terrain image data, the IG processor 150 could determine terrain image data by determining the position where each terrain cell would appear on the screen of a display unit; for example, the determination of position could include a scaling component to convert "world space" (of the view outside the aircraft) to "screen space." The IG processor 150 could determine topographical colors similar to those depicted on standard aeronautical charts based upon the terrain data. The three-dimensional perspective and topographical coloring represented by terrain image data presents an alternative view to the "blue/brown" electronic attitude indicator used in classic electronic PFDs, the creation of the perspective and employment of a coloring scheme are known to those skilled in the art.

Additionally, the IG processor 150 could receive location data received from the location data source 130. The IG processor 150 could determine location highlighters associated with the location data. The IG processor 150 could determine highlighter data by determining the position where the symbology would appear on the screen of a display unit; for example, a determination of the position made by the IG processor 150 could include a scaling component to convert "world space" to "screen space." Then, an IG processor 150 could then ensure that the highlighter data will provide a sufficient contrast with the terrain data and symbology of flight information. Then, the highlighter data may be combined with the terrain image data to form an image data set that will be provided to the tactical display unit 142 and/or the strategic display unit 144 for presentation to a pilot or flight crew.

In the drawings of FIGS. 6A through 7D, the advantages and benefits of the embodiments discussed herein may be illustrated in by showing examples of enhancing locations through the use of highlighter bands with location highlighters as embodied herein. Although these examples will be drawn towards depictions of highlighter bands presented on an HDD unit, the embodiments herein are not exclusive to the HDD unit but could include other display unit(s) such as the HUD unit.

Figure 6A:
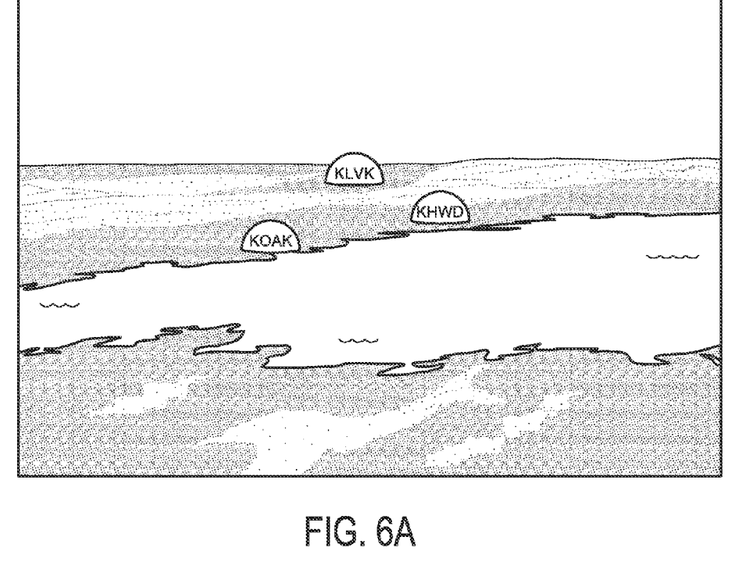
FIG. 6A provides an example of an image presenting three-dimensional location highlighters with optional alpha-numeric information against the background of a three-dimensional perspective of a scene outside the aircraft.

FIG. 6A provides an example of an image presenting location highlighters with optional alpha-numeric information against the background of a three-dimensional perspective of a scene outside the aircraft. As indicated by four-letter identifiers "KOAK", "KHWD", and "KLVK" that have been assigned by the International Civil Aviation Organization ("ICAO"), the locations highlighted in FIG. 6A correspond to the Oakland International Airport, Hayward Executive Airport, and Livermore Municipal Airport, respectively, each of which are located in Alameda County, Calif., United States. In the examples presented herein, it will be assumed that KOAK and KLVK are the destination and alternate airports, respectively, stated in a flight plan.

In this instance, three-dimensional domes illuminate the locations of KOAK, KHWD, and KLVK shown in FIG. 6A. In this example, the use of location highlighters enhances a pilot's ability to determine the locations of airports by making the locations of the airports conspicuous against surrounding environment (i.e., terrain). By making the locations of the airports conspicuous with illuminating symbologies of location highlighters, the likelihood of objects blending in with the ground or tactical information symbology may be significantly reduced while situational awareness of the pilot is simultaneously enhanced. Additionally, illuminating symbologies of location highlighters could illuminate locations of objects that are hidden. For example, an airport that is blocked from the pilot's line-of-sight as discussed above could nevertheless be illuminated, thereby allowing the pilot to approximate the location of the airport.

Figure 6B:
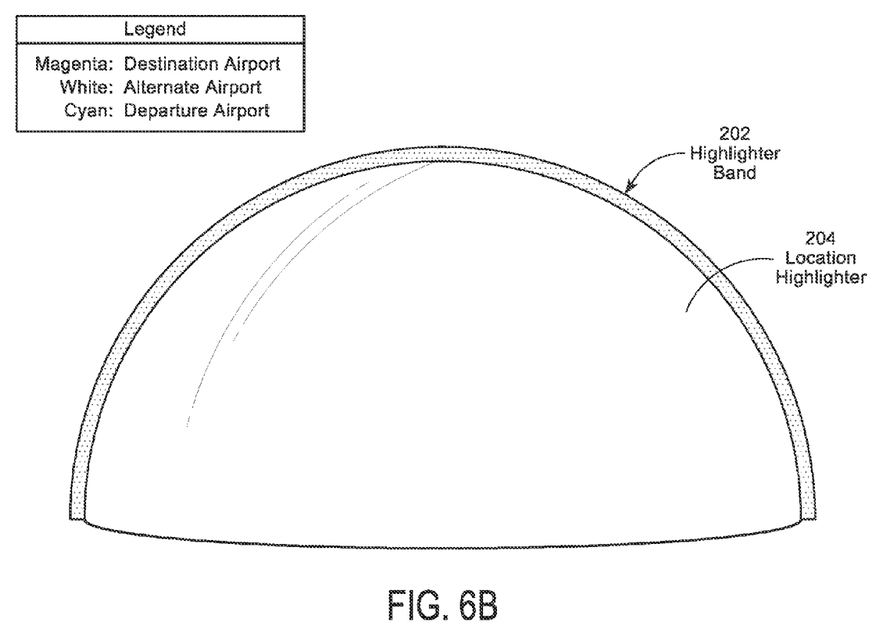
FIG. 6B provides an example of a highlighter band included with a three-dimensional location highlighter.

FIG. 6B provides an example of a highlighter band 202 that may be included with the location highlighter 204. As observed, the highlighter band 202 is conspicuous from the location highlighter 204; that is, the visual appearance of the highlighter band 202 is conspicuous from the visual appearance of the location highlighter 204. Although not shown, there could be multiple highlighter bands employed for location highlighter; for example, a pair of highlighters could be seen as criss-crossing one another.

A plurality of highlighter band configurations is available to a manufacturer or end-user. Those skilled in the art will appreciate the ability and ease with which executable software code may be reprogrammed or modified by a manufacturer or end-user to facilitate a configuration of highlighter band symbology selected by a manufacturer or end-user without affecting or expanding the scope of the embodiments discussed herein. As embodied herein, highlighter bands may employ the same enhancing effects that are available for location highlighters while maintaining conspicuousness with them.

As shown in FIG. 6B, a location band could border the location highlighter either fully or partially. As shown in FIG. 6B, the highlighter band 202 is comprised of a partial border that borders the upper surface of the location highlighter 204.

On a display unit capable of displaying colors, a highlighter band could be enhanced by color on a display where colors may be presented, and such color could remain steady regardless of the distance between the object and the aircraft or vary as a function of the distance. For the purpose of illustration and not of limitation, colored highlighter bands may be used to distinguish or differentiate between objects stated in the flight plan. As shown in FIG. 6B, the colors of magenta, white, and cyan may be employed to indicate the destination, alternate, and departure airports, respectively.

Figure 6C:
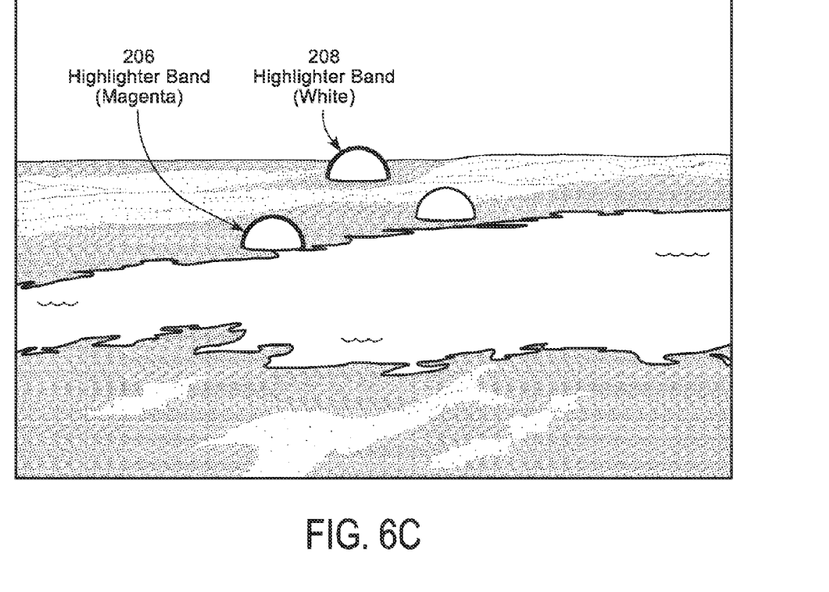
FIG. 6C provides an example of color-coded highlighter bands corresponding to three-dimensional location highlighters.

Referring to FIG. 6C, the color of highlighter band 206 is magenta, identifying the object as the destination airport (i.e., KOAK); likewise, the color of highlighter band 208 is white, identifying the object as the alternate airport (i.e., KLVK). Because KHWD has not been stated in the flight plan, a highlighter band has not been included with the KHWD location highlighter. In FIG. 6C, the colored highlighter bands 206 and 208 are depicted as two-dimensional lines, providing visual conspicuousness with the three-dimensional location highlighters of KOAK and KLVK.

On a monochrome HUD unit where a color of white may be converted to a single color, the highlighter band 208 of white could correspond to transparency as disclosed by VanDerKamp et al in U.S. Pat. No. 8,384,730 entitled "System, Module, and Method for Generating HUD Image Data from Synthetic Image Data," which is incorporated by reference herein in its entirety. As such, where a single color perspective of a terrain scene has the visually appearance of a three-dimensional, lighted solid terrain image formed by varying the brightness of the single color, the highlighter band 208 may visually appear as a transparent band against such terrain image and above the location highlighter 208. The generation of such three-dimensional, lighted solid terrain image has been disclosed by VanDerKamp et al in U.S. Pat. No. 8,264,498 entitled "System, Apparatus, and Method for Presenting a Monochrome Image of terrain on a Head-Up Display Unit," which is incorporated by reference herein in its entirety.

Figure 6D:
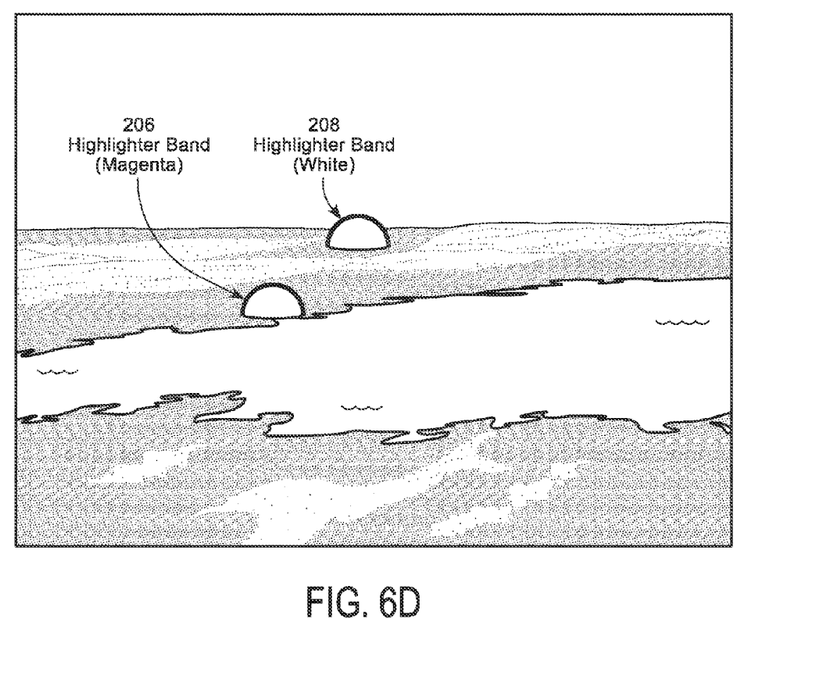
FIG. 6D provides a second example of color-coded highlighter bands corresponding to three-dimensional location highlighters.

As shown in FIG. 6C, a highlighter band has not been included with the location highlighter of KHWD. For those objects appearing in an image of the scene outside the aircraft but not stated in the flight plan, a location highlighter may be excluded from the image. Referring to FIG. 6D, the location highlighter of KHWD does not appear in the image.

Figure 7A:
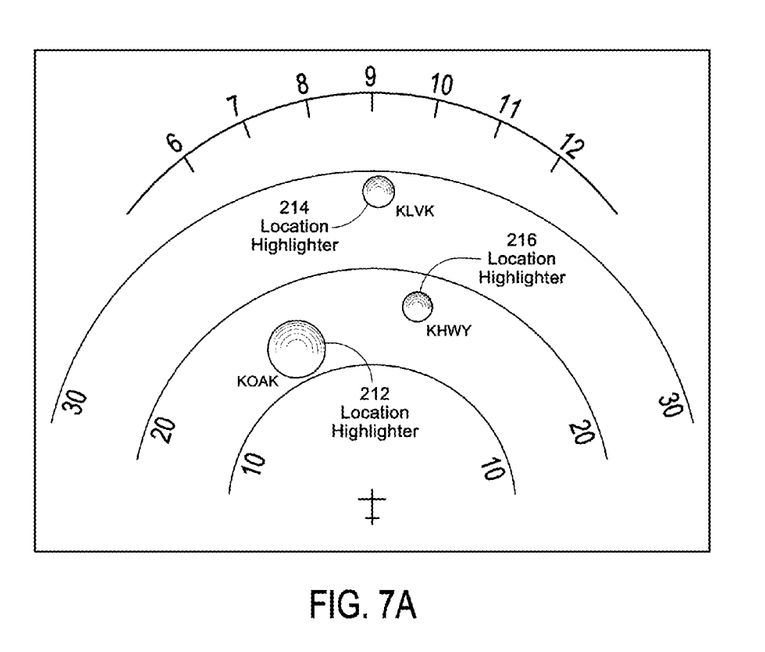
FIG. 7A provides an example of an image presenting two-dimensional location highlighters with optional alpha-numeric information.

Location highlighters and/or location bands may be employed on the strategic display unit 144. FIG. 7A provides an example of a two-dimensional "plan view" image corresponding to a scene outside the aircraft and displayed on the strategic display unit of FIG. 5C. As shown in FIG. 7A, location highlighters 212, 214, and 216 are presented with optional alpha-numeric information. In this instance, two-dimensional circles to which configurable enhancing effects (such as those enhancing effects that may be available to three-dimensional location highlighters) have been applied to illuminate the locations of KOAK, KHWD, and KLVK shown in FIG. 7A.

Figure 7B:
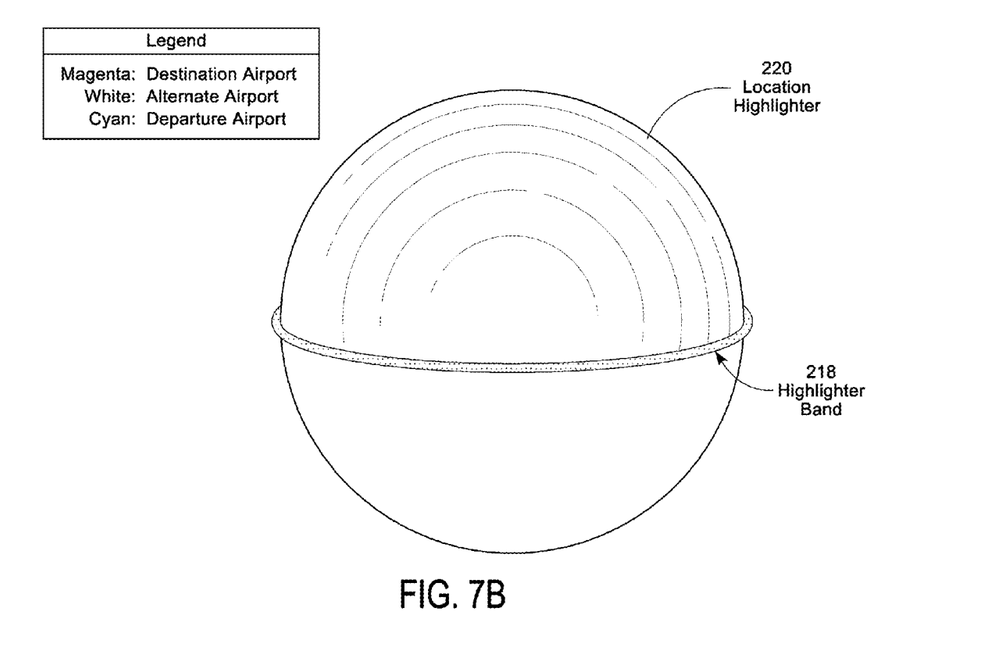
FIG. 7B provides an example of a highlighter band and a two-dimensional location highlighter.

FIG. 7B provides an example of a highlighter band 218 that may be included with the location highlighter 220. As observed, the highlighter band 218 is conspicuous from the location highlighter 220; that is, the visual appearance of the highlighter band 218 is conspicuous from the visual appearance of the location highlighter 220. As shown in FIG. 7B, a location band could extend across the two-dimensional location highlighter and approximately perpendicular with the direction between the aircraft and the highlighted object (a location band could also extend across the three-dimensional location highlighter); alternatively, the location band could be a border that encompasses the location highlighter partially or entirely. As discussed above, colored highlighter bands may be used to distinguish or differentiate between objects stated in the flight plan. As shown in FIG. 7B, the colors of magenta, white, and cyan may be employed to indicate the destination, alternate, and departure airports, respectively. As discussed above, there could be multiple highlighter bands employed for location highlighter; for example, a pair of highlighters could be seen as criss-crossing one another.

Figure 7C:
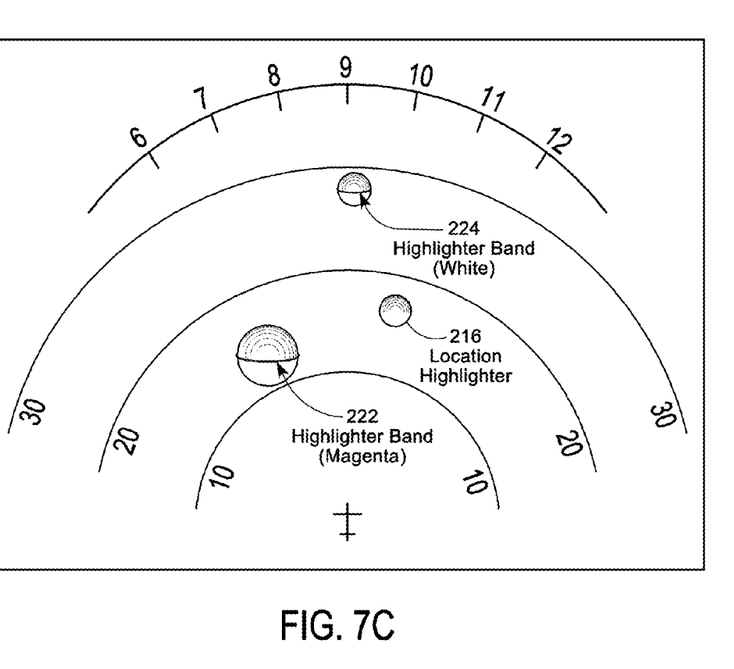
FIG. 7C provides an example of color-coded highlighter bands corresponding to two-dimensional location highlighters.

Referring to FIG. 7C, the color of highlighter band 222 is magenta, identifying the object as the destination airport (i.e., KOAK); likewise, the color of highlighter band 224 is white, identifying the object as the alternate airport (i.e., KLVK). The colored highlighter bands 222 and 224 are depicted as two-dimensional lines that are visually conspicuous with the two-dimensional location highlighters of KOAK and KLVK.

Figure 7D:
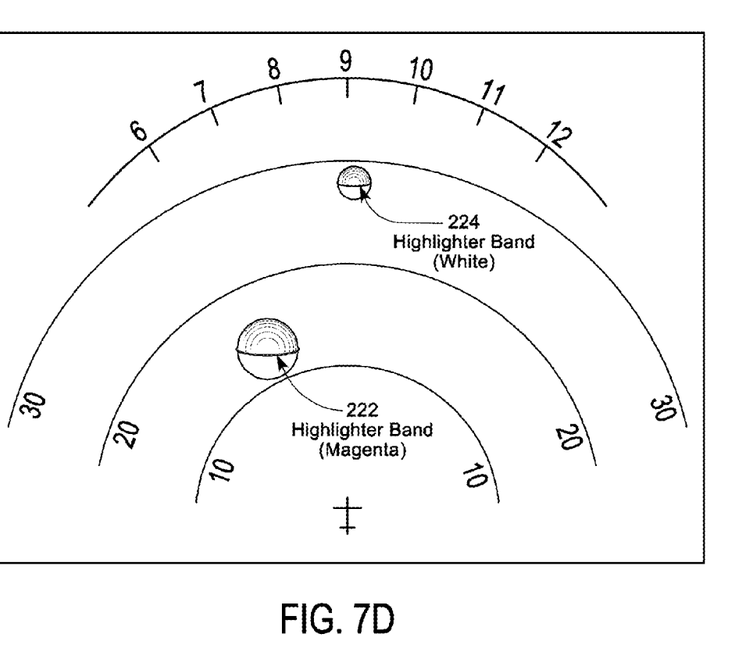
FIG. 7D provides a second example of color-coded highlighter bands corresponding to two-dimensional location highlighters.

As shown in FIG. 7C, a highlighter band has not been included with the KHWD location highlighter 216. For those objects appearing in an image but not stated in the flight plan, a location highlighter may excluded from the image. Referring to FIG. 7D, the location highlighter 216 does not appear in the image.

Figure 8:
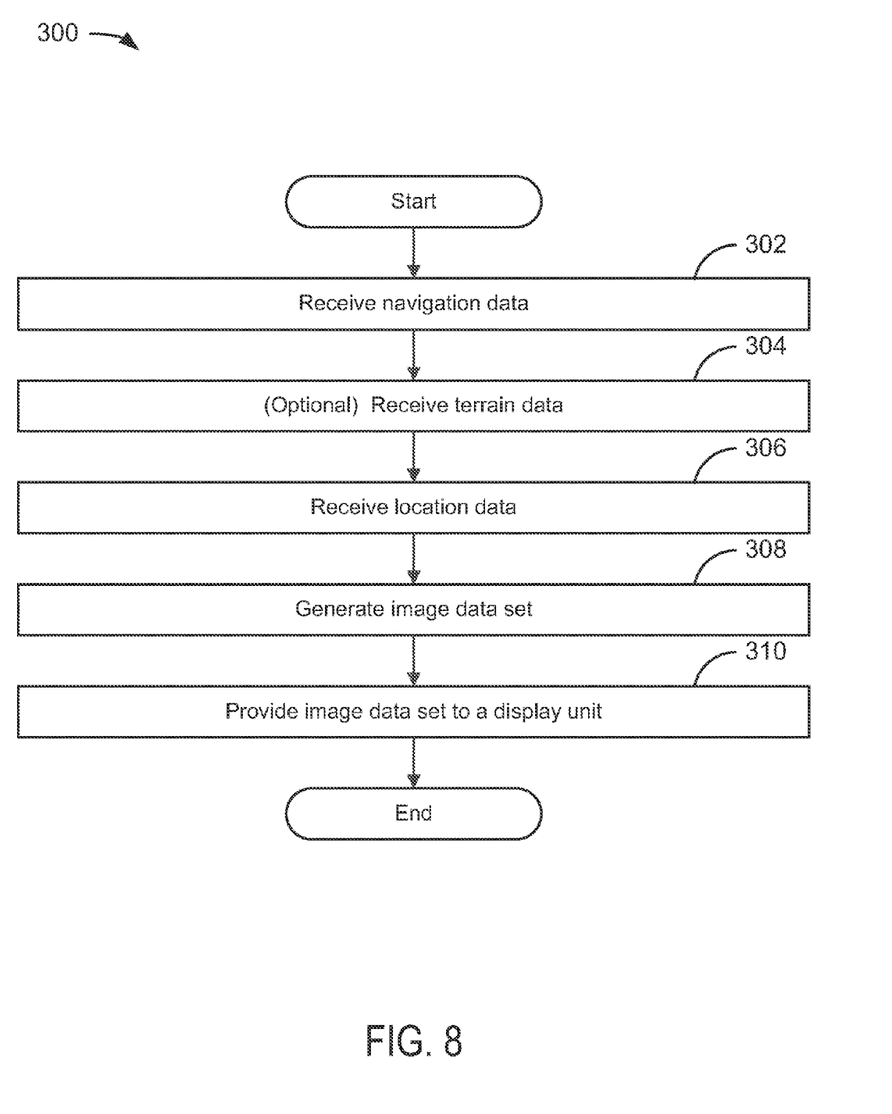
FIG. 8 provides a flowchart illustrating a method for enhancing the image with the use of location highlighters and/or highlighter bands.

FIG. 8 depicts a flowchart 300 of an example of a method for generating at least one location highlighter for enhancing an object on an aircraft display unit. The flowchart begins with module 302 with the receiving of navigation data by an IG processor 150 including data representative of the aircraft position and attitude in flight. The navigation data could be provided by a navigation system 110 to an IG processor 150, and position could comprise of geographic position (e.g., latitude and longitude coordinates) and altitude. As embodied herein, the receiving of data by a processor or the providing of data to a processor may include a step in which the processor performs a retrieval operation of such data. As embodied herein, a change in aircraft position could be used to determine the heading or direction of a scene outside the aircraft. In another embodiment, the data could include flight plan information in which one or more objects are stated.

The flowchart continues with optional module 304 with the receiving of terrain data. Terrain data may be received from a terrain data source 120. In one embodiment, terrain data of a scene outside the aircraft could be provided by a terrain database. In another embodiment, terrain data could be provided by other aircraft systems or components thereof including, but not limited to, an SVS, an EVS, and a TAWS.

The flowchart continues with module 306 with the receiving of location data. Location data of one or more objects located outside the aircraft may be received from location data source 130. Location data could be used to determine highlighter data associated with each object. In one embodiment, a location data source could comprise an airport database. In another embodiment, a location data source could comprise a navigation database. In another embodiment, a location data source could comprise an airspace database. In another embodiment, a location data source could comprise other aircraft systems including, but not limited to, a flight management system and an AAWS.

The flowchart continues to module 308 with the generation of an image data set by an IG processor 150 as a function of location highlighter data associated with the location data, where the location highlighter data may be determined as a function of the type of each object and comprised of data representative of enhancing effects. The image data set could be representative of each object enhanced with a location highlighter of a multi-dimensional image, where the multi-dimensional image could be comprised of a two-dimensional image or a three-dimensional image.

In another embodiment, the image data set could also be representative of one or more objects enhanced with one or more highlighter bands corresponding to a location highlighter, where the function for generating such image data set could include highlighter band data. As embodied herein, highlighter band data may be determined as a function of the navigation data representative of flight plan information and comprised of data representative of enhancing effects.

As discussed above, one or more location highlighters and/or highlighter bands could be available and configurable to a manufacturer or end-user. In one embodiment, the appearance of each location highlighter and/or highlighter band could depend on the object (e.g., airport, navigation facility, type of airspace, etc.). In another embodiment, each location highlighter and/or highlighter band could appear as multi-dimensional. In another embodiment, the appearance of each location highlighter and/or highlighter band could comprise enhancing effects. In another embodiment, each location highlighter and/or highlighter band could be color-coded, where the use of colors could be based upon criteria such as, but not limited to, distance from the aircraft, type of object, and/or whether or not it has been stated in the flight plan. In another embodiment, each location highlighter and/or highlighter band could remain steady or flash intermittently. In another embodiment, each location highlighter may include an identifier that could display an alpha-numeric identifier such as, but not limited to, ICAO and/or IATA airport identifiers.

The flowchart continues to module 310 with the providing of an image data set to a display unit of the display system 140. In an embodiment, the image data set may be representative of an image presented on the strategic display unit 144 comprised of one or more enhancements highlighting a respective object with the location highlighters and/or highlighter bands as disclosed herein. In another embodiment, the image data set may be representative of a three-dimensional perspective of a scene outside the aircraft presented on the tactical display unit 142 and comprised of terrain and one or more enhancements highlighting a respective object with the location highlighters and/or highlighter bands as disclosed herein. Then, the flowchart proceeds to the end.

It should be noted that the method steps described above may be embodied in computer-readable media as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as falling within the true spirit and scope of the present invention.

What is claimed is:

1. A system for enhancing an image presented to the pilot on a display unit, such system comprising:
   a source of navigation data;
   a source of location data of at least one object;
   an image generating processor configured to
      receive navigation data representative of at least aircraft position and a flight plan;
      receive location data corresponding to the navigation data and representative of a fixed location of at least one object located outside the aircraft, where
         the fixed location has been predefined prior to flight;

generate an image data set as a function of location highlighter data associated with the location data and highlighter band data associated with the flight plan, where
the location highlighter data is determined as a function of the type of each object, and
the location highlighter data and the highlighter band data are comprised of data representative of enhancing effects, such that
the image data set is representative of each object enhanced with a location highlighter of a multi-dimensional image, and
at least one object highlighted with at least one arc-shaped highlighter band; and
provide the image data set to a display unit; and
the display unit configured to
receive the image data set, and
present an image represented in the image data set, whereby
at least one location highlighter appears superimposed against the multi-dimensional image, and
at least one arc-shaped highlighter band appears with one location highlighter.

2. The system of claim 1, wherein
the multi-dimensional image is comprised of a two-dimensional image, and
the display unit is comprised of a strategic display unit.

3. The system of claim 1, wherein at least one arc-shaped highlighter band extends entirely across one location highlighter when presented in a plan view.

4. The system of claim 1, wherein a border at least one location highlighter is, when presented in a three-dimensional view, either partially or entirely comprised of at least one arc-shaped highlighter band.

5. The system of claim 1, further comprising:
a source of terrain data, where
the image generating processor is further configured to
receive terrain data corresponding to the navigation data, such that
the multi-dimensional image is comprised of a three-dimensional perspective,
the function used in the generating of the image data set includes the terrain data, whereby
each location highlighter appears superimposed against a three-dimensional perspective of terrain.

6. The system of claim 5, wherein a border at least one location highlighter is, when presented in a three-dimensional view, either partially or entirely comprised of at least one arc-shaped highlighter band.

7. A device for enhancing an image presented to a pilot on a display unit, such device comprising:
an image generating processor configured to
receive navigation data representative of at least aircraft position and a flight plan;
receive location data corresponding to the navigation data and representative of a fixed location of at least one object located outside the aircraft, where
the fixed location has been predefined prior to flight;
generate an image data set as a function of location highlighter data associated with the location data and highlighter band data associated with the flight plan, where
the location highlighter data is determined as a function of the type of each object, and
the location highlighter data and the highlighter band data are comprised of data representative of enhancing effects, such that
the image data set is representative of each object enhanced with a location highlighter of a multi-dimensional image, and
at least one object highlighted with at least one arc-shaped highlighter band; and
provide the image data set to a display unit configured to present an image represented in the image data set on the display unit, whereby
at least one location highlighter appears superimposed against the multi-dimensional image, and
at least one arc-shaped highlighter band appears with one location highlighter.

8. The device of claim 7, wherein
the multi-dimensional image is comprised of a two-dimensional image, and
the display unit is comprised of a strategic display unit.

9. The device of claim 7, wherein at least one arc-shaped highlighter band extends entirely across one location highlighter when presented in a plan view.

10. The device of claim 7, wherein a border of at least one location highlighter is, when presented in a three-dimensional view, either partially or entirely comprised of at least one arc-shaped highlighter band.

11. The device of claim 7, wherein
the image generating processor is further configured to
receive terrain data corresponding to the navigation data, such that
the multi-dimensional image is comprised of a three-dimensional perspective,
the function used in the generating of the image data set includes the terrain data, whereby
each location highlighter appears superimposed against a three-dimensional perspective of terrain.

12. The device of claim 11, wherein a border of at least one location highlighter is, when presented in a three-dimensional view, either partially or entirely comprised of at least one arc-shaped highlighter band.

13. A method for enhancing an image presented to a pilot on a display unit, such method comprising:
receiving navigation data representative of at least aircraft position and a flight plan;
receiving location data corresponding to the navigation data and representative of a fixed location of at least one object located outside the aircraft, where
the fixed location has been predefined prior to flight;
generating an image data set as a function of location highlighter data associated with the location data and highlighter band data associated with the flight plan, where
the location highlighter data is determined as a function of the type of each object, and
the location highlighter data and the highlighter band data are comprised of data representative of enhancing effects, such that
the image data set is representative of each object enhanced with a location highlighter of a multi-dimensional image, and
at least one object highlighted with at least one arc-shaped highlighter band; and
providing the image data set to a display unit configured to present an image represented in the image data set on the display unit, whereby at least one location highlighter appears superimposed against the multi-dimensional image, and at least one arc-shaped highlighter band appears with one location highlighter.

14. The method of claim 13, wherein the multi-dimensional image is comprised of a two-dimensional image, and the display unit is comprised of a strategic display unit.

15. The method of claim 13, wherein at least one arc-shaped highlighter band extends entirely across one location highlighter presented when in a plan view.

16. The method of claim 13, wherein a border of at least one location highlighter is, when presented in a three-dimensional view, either partially or entirely comprised of at least one arc-shaped highlighter band.

17. The method of claim 13, further comprising:

receiving terrain data corresponding to the navigation data, such that the multi-dimensional image is comprised of a three-dimensional perspective, the function used in the generating of the image data set includes the terrain data, whereby each location highlighter appears superimposed against a three-dimensional perspective of terrain.

18. The method of claim 17, wherein a border of at least one location highlighter is, when presented in a three-dimensional view, either partially or entirely comprised of at least one arc-shaped highlighter band.

* * * * *